US007222653B2

(12) United States Patent
Robitaille et al.

(10) Patent No.: US 7,222,653 B2
(45) Date of Patent: May 29, 2007

(54) AUTOMATIC GUIDE ARMS APPARATUS

(75) Inventors: Martin Robitaille, 4765, St-Félix, St-Augustin-de-Desmaures, Québec (CA) G3A 1B2; Steve Gagnon, Quebec (CA)

(73) Assignee: Martin Robitaille, Saint-Augustin-de-Desmaures, Québec (CA)

( * ) Notice: Subject to any disclaimer, the term of this patent is extended or adjusted under 35 U.S.C. 154(b) by 0 days.

(21) Appl. No.: 11/209,818

(22) Filed: Aug. 24, 2005

(65) Prior Publication Data

US 2005/0279462 A1 Dec. 22, 2005

Related U.S. Application Data

(63) Continuation-in-part of application No. 09/945,524, filed on Sep. 4, 2001, now abandoned.

(30) Foreign Application Priority Data

Apr. 3, 2001 (CA) .................................... 2342495

(51) Int. Cl.
*B32B 37/00* (2006.01)
*B65C 20/00* (2006.01)

(52) U.S. Cl. ...................... 156/351; 156/361; 156/367; 156/470; 156/574; 226/179

(58) Field of Classification Search ................ 156/361, 156/367, 368, 378, 379, 574, 577, 523, 470, 156/462, 539, 543; 226/179; 162/289
See application file for complete search history.

(56) References Cited

U.S. PATENT DOCUMENTS

| | | | |
|---|---|---|---|
| 4,403,744 | A | 9/1983 | Reese et al. |
| 4,452,837 | A | 6/1984 | Clausen et al. |
| 4,962,639 | A | 10/1990 | Blase |
| 4,995,937 | A | 2/1991 | Persson |
| 5,087,313 | A | 2/1992 | Duecker |
| 5,244,518 | A | 9/1993 | Krayenhagen et al. |
| 5,759,339 | A | 6/1998 | Hartman |
| 2002/0170938 | A1 | 11/2002 | Shea et al. |

*Primary Examiner*—George Koch
(74) *Attorney, Agent, or Firm*—Robert Brouillette; Brouillette & Partners

(57) ABSTRACT

This invention relates to an improvement in an apparatus for dispensing a ribbon between layers of web material and more particularly, to an automated and remote positioning system of ribbon dispensers which are precisely positioned with respect to the web material by a controlling and monitoring system and are physically easily accessible for maintenance by an operator. The automated and remote positioning system of ribbon dispensers includes locking means interacting with either the apparatus or with a traversing mechanism such as a lead screw to move the ribbon dispensers.

22 Claims, 6 Drawing Sheets

AUTOMATIC GUIDE ARMS APPARATUS

RELATED APPLICATION DATA

This present application is a continuation-in-part of commonly assigned U.S. patent application Ser. No. 09/945,524, filed on Sep. 4, 2001, now abandoned entitled “Automatic Guide Arms Apparatus” which is incorporated herein by reference.

FIELD OF THE INVENTION

This invention relates to an improvement in an apparatus for dispensing a ribbon, i.e., tape, web or string, generally referred to herein as “ribbon”, between layers of paper-like web material at the laminating end of a web making machine or the web end of a corrugating machine. One aspect of the present invention is the positioning of novel ribbon dispensing guide arms to locate each guide arm with precision transversely with respect to the web laminating machine path, and doing so remotely and automatically.

DESCRIPTION OF THE PRIOR ART

The commercially available guide arms are not remotely positioned by the use of independent drives for the arms to afford the proper location of one or more arms across the full width of the guide rail by having a feed-back on the exact location of each guide arm and adjust this position in relation to the lateral movement of the web in a continuous manner. Previously, the guide arms were mounted on a beam placed in the laminating machine and the beam had to be removed from the machine for any extensive adjustment of the arms. The guide arms then had means for individual adjustment but the amount of movement was limited.

More recently a machine was introduced which gave back the position of the guide arms as an electronic reading on a display screen from which the operator could adjust each guide arm remotely but manually. The operator still has to determine if each ribbon in the laminator is at its required position and manually adjusts it. Furthermore, to thread up each guide arm with the ribbon, either at start-up or if a ribbon broke during operation, the laminator machine has to be stopped and the complete guide arm system has to be removed to gain access to the guide arms to be threaded. The same problem happens when multiple orders are being planned on the laminator. If one more ribbon has to be added in the following production run on the laminator, the laminator has to be stopped and the complete guide arm system has to be removed from the laminator to thread-up the supplemental guide arm.

Finally the existing remotely adjustable guide arms U.S. Pat. No. 5,759,339 uses a belt system to position each guide arm. Using a belt is not precise enough, the belt being too flexible, preventing the operator from obtaining the adequate positioning of each ribbon.

Further, the space available in the laminating or corrugating machines for the placement of individual remotely adjustable guide arms for the ribbon, used to provide reinforcement or to provide a tear tape for the future package, is generally limited in cross-sectional area, e.g., the area available is generally limited to a right triangular area with the two legs adjacent the right angle being about 8 inches and 16.5 inches (20 cm and 42 cm) respectfully. The area is located between guide rolls for the individual webs being laminated and the double backer rolls where the webs are being placed in intimate contact transversely to the in-machine direction across the entire width of the webs. The webs typically include a liner and a single faced web having flutes on one side thereof extending transversely to the direction of movement of the web. The substrate could alternatively be formed of any number of continuous sheet-like webs, including fabrics (both woven and nonwoven), plastic film, felted materials, foil, etc., particularly Kraft paper, materials used in corrugated board and other water-laid and airlaid paperlike and nonwoven materials. U.S. Pat. No. 4,452,837 issued Jun. 5, 1984 generally discloses a machine of the type associated with the present invention and discloses a system using ribbons pre-coated with a “hotmelt” type of adhesive for providing improved reinforcement of a sheet-like substrate where a plurality of ribbons are fed through a guide member onto a sheet-like web. In this patented device the guide is a reciprocating bar having eyelets for receiving a plurality of ribbons which bar places the ribbons onto the web in a serpentine pattern to provide continuous reinforcement of the substrate in both the machine direction and transversely.

The present invention provides an apparatus and method for precisely placing one or more continuous ribbons on the web, the ribbons extending parallel in the machine direction. A plurality of ribbons would be placed in transversely spaced relationship. Changes in the position of any one or more of the ribbon dispensing guide arms is accomplished remotely of the location of the guide arms on a guide beam. The apparatus also uses an electronic system to automatically determine the edge of the web and feed-back the information to the control unit which in turn adjust each guide arm automatically and adequately, even when the web is moving laterally over time. The control unit is also used to preprogram the different tape positions in memory by order numbers, so the operator can position each guide arm automatically without stopping the laminator when running multiple orders on the laminator. Changes in position of the ribbons are dictated by the use of the substrate in the later manufacture of the bag or carton. The ribbons can be coated with a hot melt type adhesive and bonded to the web during the laminating. Depending on the strength of the ribbon, the same will be a suitable transverse reinforcement of the substrate or serve as a tear strip affording ease in opening the container to be formed from the substrate.

SUMMARY OF THE INVENTION

The present invention is directed to an apparatus for applying a ribbon to a web during the processing of the web, i.e., for the manufacture of a substrate for container construction. The apparatus of the present invention is used to dispense a ribbon onto a web in a predetermined position and to be able to adjust the position of the ribbon with relationship to the edges of the web remotely and automatically. The apparatus includes a frame defining a web path, the web path having a path width, and supporting a lead screw used to move each guide arm along the frame, locking means to position the guide arm in a desired fixed position along the guide rail, means for determining the position of the guide arm transversely of the web direction of movement or the machine direction of the web and means for adjusting the position of each guide arm following the lateral movement of the web. The frame includes a guide rail. The guide arm is supported on the guide rail for movement there along. The guide arm includes guide pulleys for receiving a ribbon from a remote supply which is fed to the guide arm transversely of the web and for locating the ribbon on the web for attachment and lamination thereto.

In one embodiment the frame supports a transducer to afford a reading as to the position of the guide arm with respect to the centreline or an edge of the web. The transducer is connected to a control and display box providing a numeric digital readout giving the location along the guide beam of the guide arm or arms. The guide arms are provided with means cooperating with the transducer to afford a signal in response to a current pulse sent from the display box along the transducer. The signal from each arm is discerned by the electronics in the display box to calculate the distance any particular guide arm is from the predetermined “0” and the numeric value is displayed on the screen of the display box. Furthermore, an electronic system is used to monitor the edge of the web, which position is feed-back to the control unit which in turn sends the signal to automatically adjust the guide arms according to the lateral movement of the web, maintaining the required position of each ribbon in or on the web. The communications between the control unit and the web edge detection and guide arm position detectors are preferably done via electronic signals though infrared (IR) and radio-frequency (RF) signals could also be envisaged without departing from the scope of the invention.

In another embodiment of this invention, the width of the frame is greater than the maximum width of the web or webs that can be processed by the laminator. This maximum width of web or webs that can be processed is hereinafter defined as the “maximum web width”. With this frame having a larger width than the maximum web width, it is possible to position each guide arm in a thread-up position outside the web laminating machine path and close to the operator, so he can thread-up each guide arms without having to remove the entire guide arm system from the laminator and this, even in instance where the web being processed has the maximum web width. The guide arms can also be positioned in any position all across the maximum web width.

There is therefore provided an apparatus for the positioning of a dispenser for laminating an endless ribbon in relationship to a web moving along a web path, said web having generally parallel edges defining a web width, said web path having a width limited by a maximum web width, said apparatus comprising:

- a frame extending transversally of the web path;
- a lead screw, supported by said frame, extending transversally of the web path and coupled to a drive means, said lead screw defining a traversing path of a first predetermined length;
- a guide rail, supported by said frame and extending transversally of the web path and positioned in a parallel direction to said direction of said traversing path and said lead screw;
- a plurality of guide arms, each said guide arm having:
  - a supporting means to movably attach said guide arm to said guide rail;
  - a dispensing means for dispensing said ribbon;
  - a guide arm locking means comprising:
    - lead nut operatively connected to said lead screw;
    - means to lock said guide arm to said lead nut;
    - means to lock said guide arm to said frame;
  - each said guide arm being selectively connectable to said lead nut or to said frame.

There is furthermore provided an apparatus for the positioning of a dispenser for laminating an endless ribbon in relationship to a web moving along a web path, said web having generally parallel edges defining a web width, said web path having a width limited by a maximum web width, said apparatus comprising:

- a frame extending transversally of the web path;
- a lead screw, supported by said frame, extending transversally of said web path and coupled to a drive means, said lead screw defining a traversing path of a first predetermined length;
- a guide rail, supported by said frame and extending transversally of said web and positioned in a parallel direction to said direction of said traversing path and said lead screw;
- a plurality of guide arms, each said guide arm having:
  - a supporting means to movably attach said guide arm to said guide rail;
  - a dispensing means for dispensing said ribbon;
  - a guide arm locking means comprising:
    - lead nut operatively connected to said lead screw;
    - means to lock said guide arm to said lead nut;
    - means to lock said guide arm to said frame;
- each said guide arm being selectively connectable to said lead nut or to said frame;

wherein said first predetermined length transversely extends beyond said maximum web width.

These apparatuses can further comprise:

- communication means;
- web edge position detecting means to measure the transversal position of said web;
- guide arm position measuring means to measure the transversal position of each said guide arm;
- remote controlling means for actuating said locking means of each said guide arm and said driving means;

wherein said remote controlling means are linked to said guide arm position measuring means and web edge position detecting means via said communication means.

These and other novel features of the invention will be more fully described hereinbelow.

BRIEF DESCRIPTION OF THE DRAWINGS

The present invention will be described with reference to the accompanying drawing wherein.

DESCRIPTION OF THE PREFERRED EMBODIMENTS

The present invention provides an improved apparatus for the dispensing of a ribbon onto a moving web at a desired path on the web, with the apparatus including at least one ribbon dispensing guide arm independently adjustable transversely of the direction of movement of the web, and also includes a means to thread the ribbon on the guide arm on the outside of the moving web and outside the web path of the apparatus.

Figure 1:
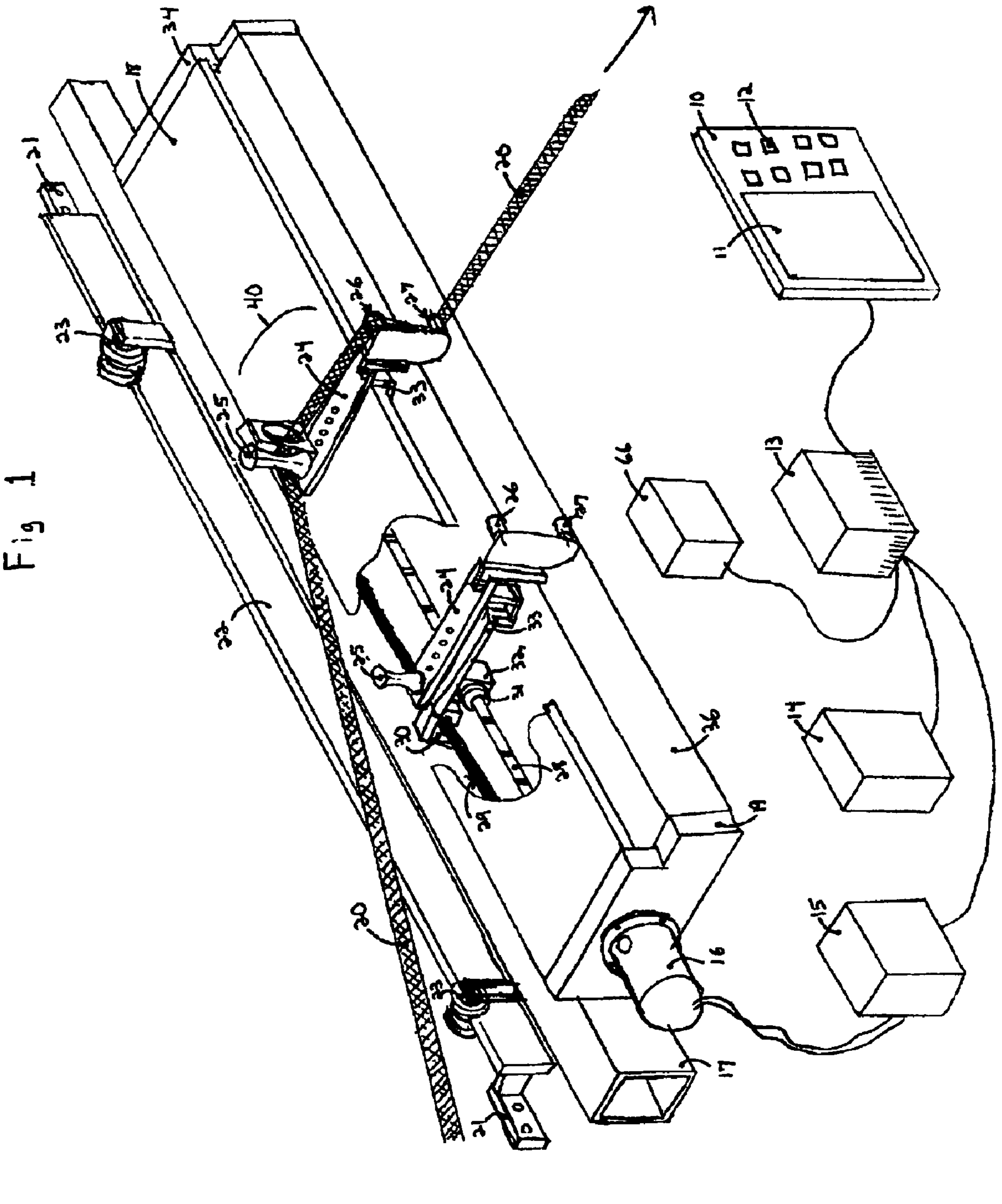
FIG. 1 is a perspective view diagrammatically showing the apparatus frame for mounting on the frame of a corrugating machine, a pair of ribbon guide arms, and the remote display panel and control boxes, with connecting parts broken away.
Figure 2:
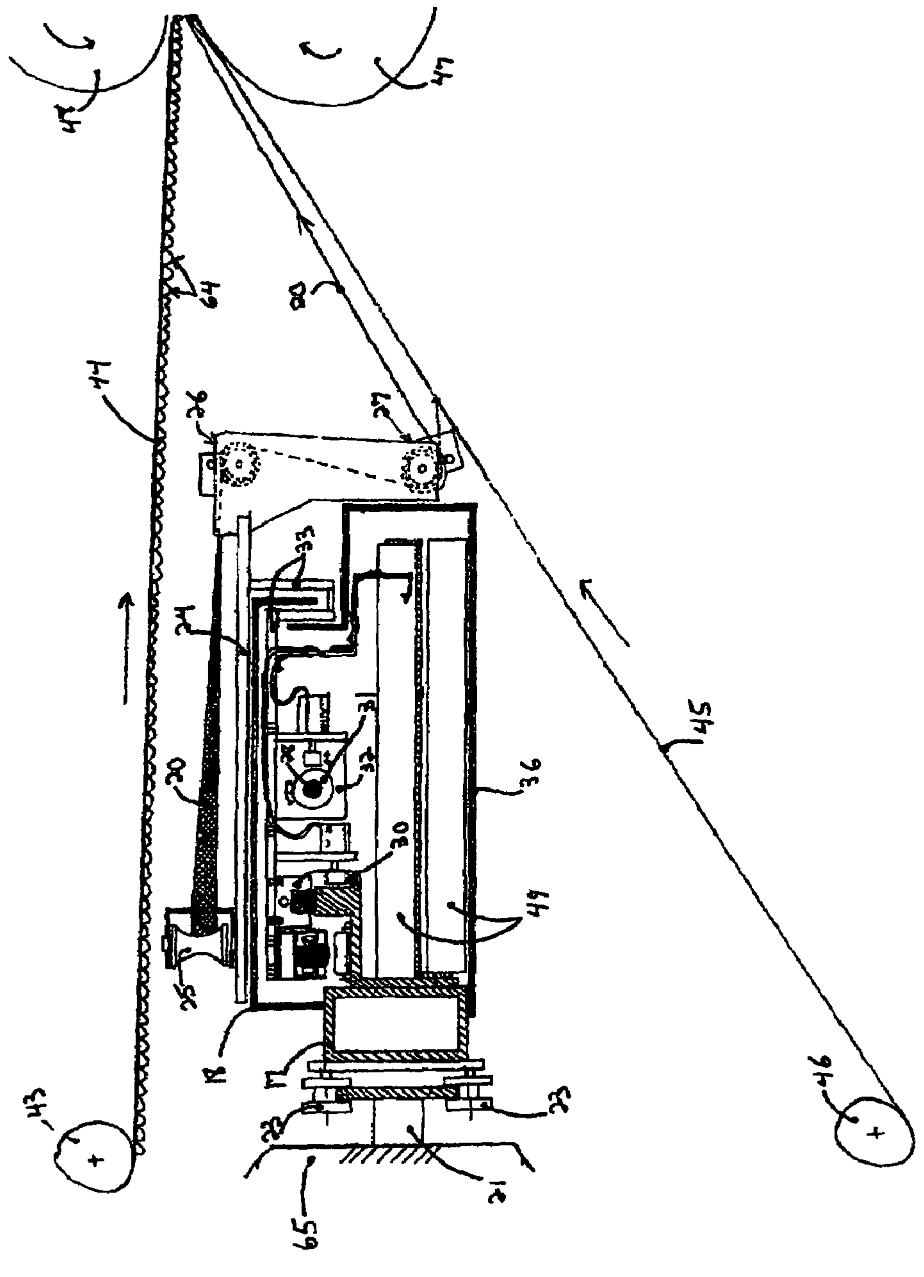
FIG. 2 is a sectional view of the apparatus at the position of a guide arm in a corrugating machine and showing the frame, guide beam and guide arm assembly.
Figure 3:
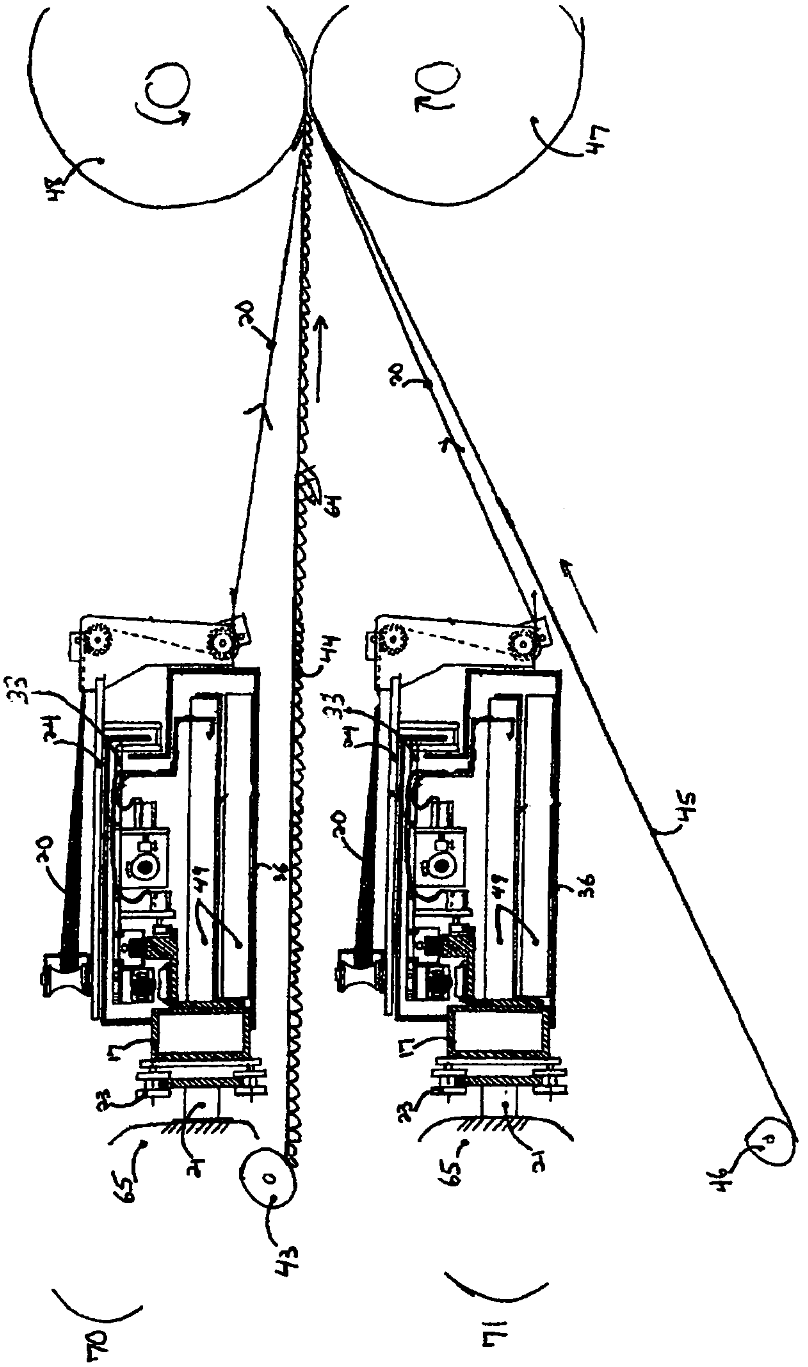
FIG. 3 is a sectional view of a corrugating machine similar to FIG. 2 having two ribbon dispensing apparatus according to the present invention, the second being placed to dispense one or more ribbons from a guide arm on the surface of the single faced web opposite the flutes.
Figure 4:
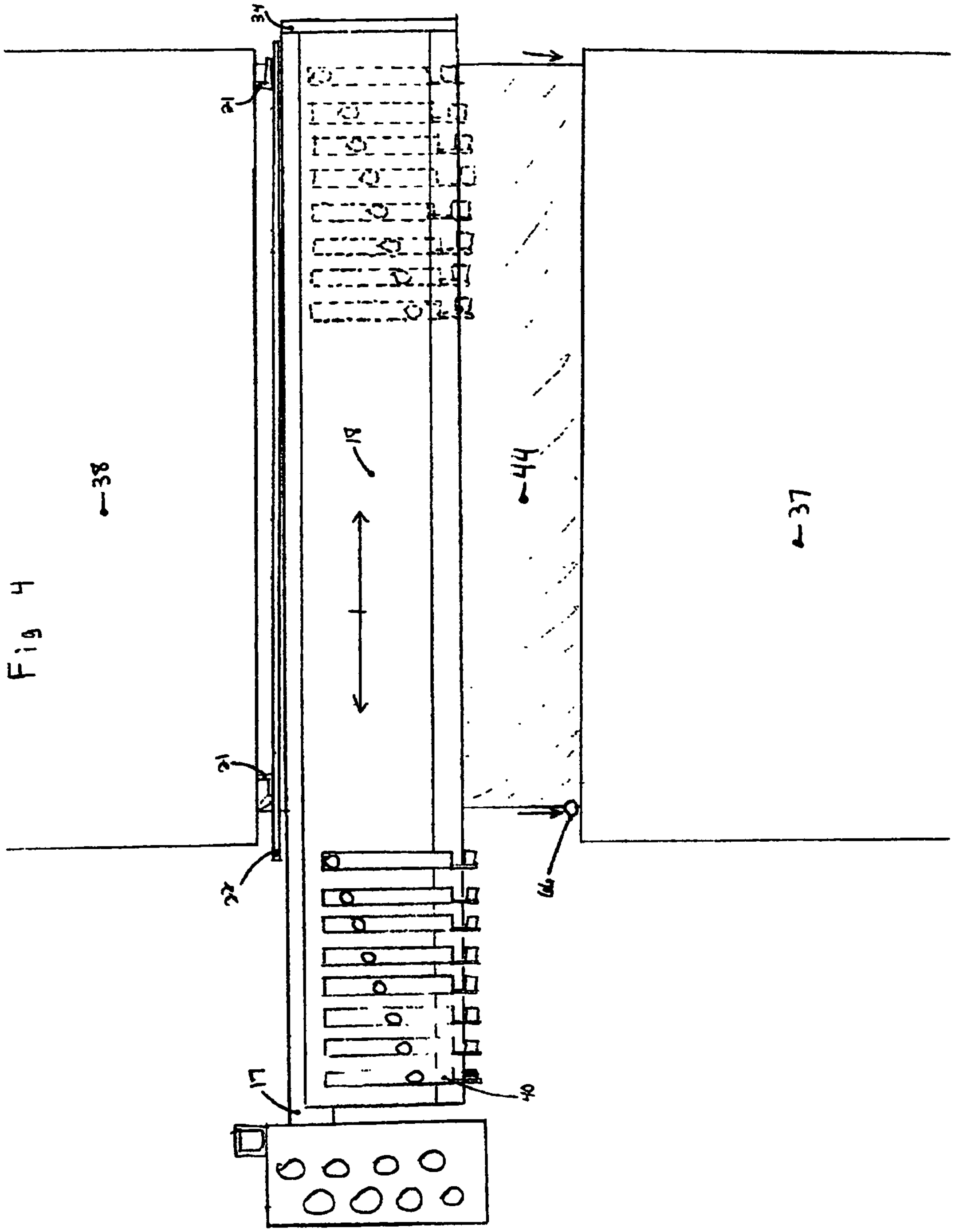
FIG. 4 is a plan view of the apparatus.
Figure 5:
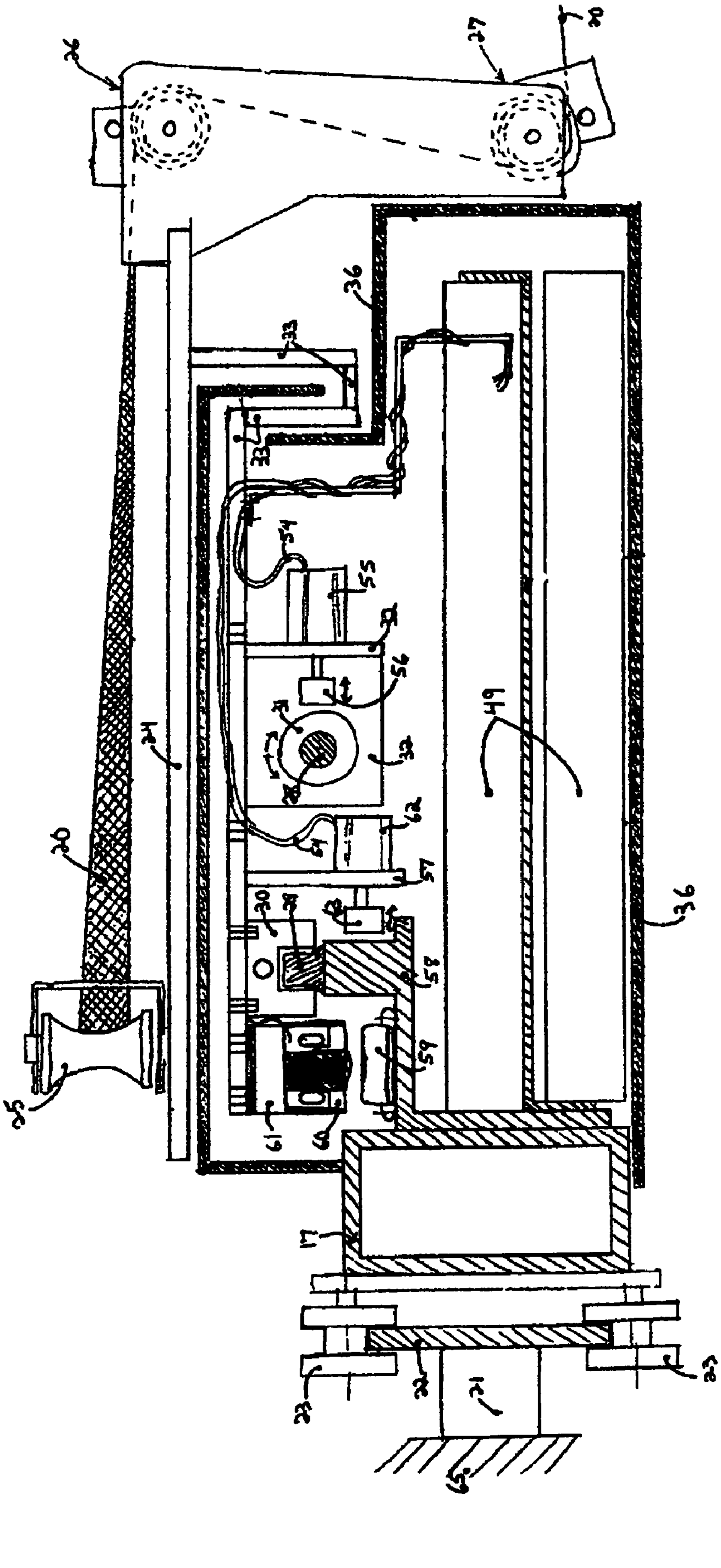
FIG. 5 is an enlarged sectional view of the apparatus showing the frame, its support, and the ribbon guide arm assembly, including the locking and positioning members in greater detail.

As illustrated in the drawing the apparatus, generally designated 70, is adapted to be positioned in a web laminating machine, e.g., a corrugation machine, within an area generally triangular in cross section defined by a guide roll 46 for a liner or lower web 45, a guide roll 43 for a single face web 44, and the opposed double backer rolls 47 and 48 that are mounted for rotation about horizontal axes which extend transversely with respect to the in-machine direction across the entire width of liner 45 and web 44. As shown in FIG. 4, the double-backer machine 37 has a limited width. Therefore, the web or webs that can be processed cannot be wider than a certain maximum width, defined above as the "maximum web width". As illustrated in FIGS. 3 & 4, an apparatus 71, corresponding to apparatus 70, can additionally be mounted above the web 44 to apply a ribbon 20 to the side of the web 44 opposite the flutes 64, and directly aligned with a ribbon 20 positioned between the flutes 64 and the liner 45. The laminate can be die cut to form a pull tab so the superimposed ribbons form a tear tape to sever the laminate along the path of the ribbons when pulled through the liner 45. Preferably, a glue machine 38 holds the guide rolls 43, 46 and a double backer machine 37 holds the double backer rolls 47, 48.

Since the apparatus 70 and 71 are similar, except for the position of the ribbon pulleys, only the construction of ribbon dispensing apparatus 70 will be further described. A frame member 65 on the corrugating machine supports a track 22 on which an apparatus frame 17 of the ribbon dispensing apparatus 70 is mounted by a plurality of support rollers, including transverse rollers 23, supported in brackets 21. The support rollers, four in all in each bracket 21, engage the top, bottom and opposite faces of the track 22, one above and one below the centreline of track 22 on each side. All of the support rollers are not shown but allow for the insertion and removal of the apparatus 70 in relationship to the right-triangular area defined above in a corrugating machine. A suitable positioning means on the machine frame 65 and on the apparatus frame 17 locate the apparatus frame 17 on the corrugating machine.

The apparatus frame 17 includes an internal support angle 58, which in turn support a bearing or guide rail 30, which is approximately 2500 mm in length, and is supported by the rollers 23 and the brackets 21. Frame members 19 & 34 support a lead screw, generally designated 28. Frame members 19 & 34 are supplied with bearing mounts to support the lead screw 28 and step motor 16 which provide the means for rotating lead screw 28. The bottom plate guide arm 33 supports the lead nut support 32 and the lead nut 31. The apparatus frame 17 further includes an angle frame member 58 which supports transducer 59. The transducer is held on internal support angle 58 by thermal insulative bushings. Further, the frame 33 has a guide rail 29 supported below the frame member 33. Frame 17 supports the internal support angle 58 which also acts as a brake bar. A cover, including a cover sheet 18 and a bottom cover 36, covers the frame 33 from the frame member 17 to the edge of member 33.

Figure 6:
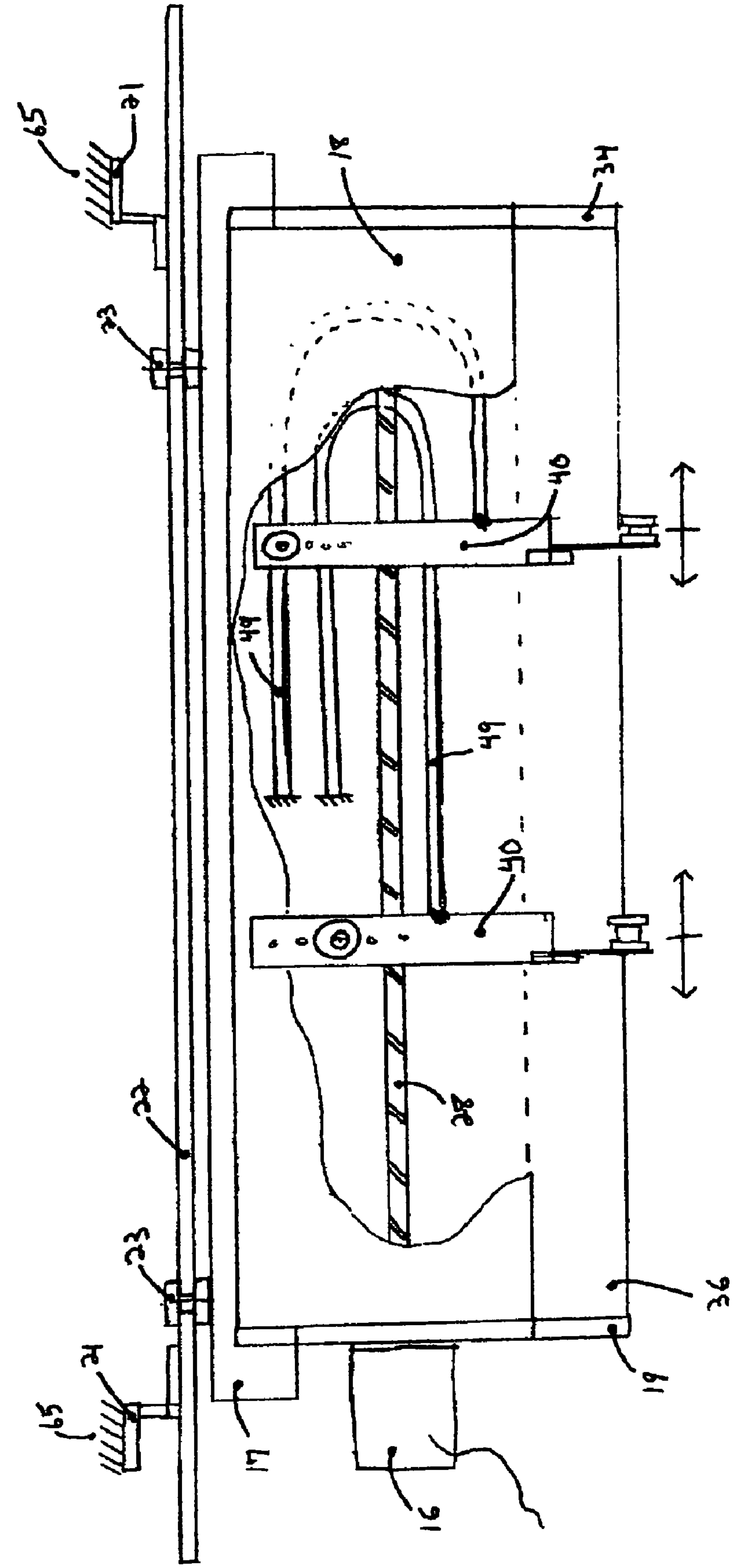
FIG. 6 is a front elevation view of the apparatus illustrating the guide beam and dispensing guide arm.

A ribbon dispensing guide arm 40 is an assembly mounted on the frame 33 for movement in relationship thereto. While only one guide arm 40 is illustrated in most views of the drawing for purposes of simplicity, a plurality of guide arm assemblies 40 are illustrated in FIG. 6. A complete system would incorporate 6 to 8 guide arms 40 of identical configuration spaced along the guide rail 29 and spaced transversely along the frame 33 and of the machine direction of the moving webs 45 and 44.

The width of lead screw 28 preferably exceeds the maximum web width of the web 45 & 44, so guide arms 40 can be positioned outside the path of the webs for easy thread up of the ribbons 20, as seen in FIG. 4. The lead screw 28 can move and position any guide arm 40 in any given position along the guide rail 29 as long as the guide arms 40 maintain their physical order. Drive means in the form of a variable speed reversible electric step motor 16, having an adapter to connect directly to lead screw 28 for direct drive.

The transducer 59 has an electromagnet 60 positioned under frame member 33. The transducer 59 is connected to a control box 13, having a display panel 11 and circuitry associated therewith, to identify the position of each of the dispensing guide arms 40 as further described herein.

The guide arms 40, one of which is described, comprise a support frame, generally designated 33, having a linear bearing 30 riding on the guide rail 29 and supporting two pneumatic cylinders 55 and 62, and an upper bracket 24 supporting a plurality of guide pulleys 25,26 and 27 for the ribbon 20. Also, the frame 33 supports a permanent magnet 60 which is attached to each guide arm 40. The permanent magnet 60 substantially surrounds the transducer 59 and is supported from a bracket 61 connected to the frame. The drive cylinder 55 is actuated by pneumatic pressure to force a rubber bumper 56 toward the lead screw 28, forcing the lead screw nut 31 to block in the lead nut support 32, thus forcing the movement of guide arm 40 when the lead screw 28 is rotating. The cylinder 55 is pneumatically operated and is returned to the normal position by a return spring. The cylinder 62 is connected to the support frame 33 by a cylinder bracket 57 and acts as a locking cylinder which is normally activated by a source of pneumatic pressure through a pneumatic pressure supply line to drive a rubber bumper 63 against the internal support angle 58 on the frame 33 locking the guide arm 40 in position to the frame 17. This lock for the guide arm 40 is normally applied and upon removal of the pneumatic pressure in the cylinder 62, the bumper 63 is separated from the internal support angle 58 by a return spring in and for the pneumatically operated cylinder 62 operating the bumper 63.

The figures of the drawing illustrate a plurality of pneumatic hoses 54 supported under frame 33. Each of the hoses 54 include a pair of pneumatic lines affording one line for each cylinder 55 and 62 of a guide arm assembly 40. Pneumatic pressure from a source supplies pressure to the hoses 54 via a valve control unit 14 and all lines are supported by energy chains 49.

The guide pulley 25 on each guide arm is the entrance pulley for the ribbon 20 entering the guide arm 40. The ribbon 20 is rotated 90 degrees from pulley 25 to engage pulley 26 on a horizontal shaft to direct the ribbon 20 to a dispensing pulley or exit pulley 27. From the pulley 27 the ribbon 20 is applied to the liner 45. On each guide arm assembly 40 the pulley 25 is adjusted along the upper bracket 24 to stagger the incoming ribbons.

In operation, the locking cylinder 62, on all guide arms 40, will be extended with the bumper 56 gripping the internal support angle 58. When one or more of the arms 40 need to be moved to a new position, the drive cylinder 55 is activated to drive the bumper 56 against the lead nut 31 locking the lead nut 31 and the lead nut support 32 so the frame 33 of the guide arm 40 will be moved by the lead screw 28. The bumper 63 of the locking brake cylinder 62 for that arm is retracted after some slight time delay. The lead screw 28 is operated by the motor 16 controlled by the motor control 15 having an operator interface 10. The motor 16 can be activated in clockwise or counter-clockwise direction to move the guide arm 40 accordingly. When the particular arm 40 reaches the correct position, the locking cylinder is extended, and the drive cylinder is retracted from the lead nut 28.

The positioning procedure is fully automated. The numeric digital readouts of each guide arm 40 are continuously trigged and displayed in the display panel 11. The operator enters on the keypad 12 the new position for each guide arm 40 with reference to preset "0". Once the new positions are entered in the display panel 11, the positioning procedure can be started. The automated procedure is as follows. First, the controller 13 checks if the new positions for the guide arms 40 are possible. Second, the controller 13 find the guide arm or guide arms 40 that can be move in first. Third, the controller 13 sends signals to the pneumatic valve 14 and to electric motor drive 15 to move the guide arm or guide arms 40 to the new positions. Four, the controller 13 checks if positions have been reached within the preset limits, and if not the guide arm or guide arms 40 are moved again. To find the position of a guide arm 40, the control circuitry triggers the transducer to send a current pulse down a wire held inside the linear transducer rod 59. The current in the wire creates an electric field about the wire. When the current flowing down the wire reaches the arm 40 in question, the electric field of the wire interacts with the magnetic field of the permanent horse-shoe magnet 60 on the guide arm 40. This interaction creates a torque in the wire producing a signal by the arm. The electronics of the transducer head calculates how long in time it was from when the current pulse was sent down the wire to when the reaction signal in the wire is sensed. From this information, position of the arm is discerned and the distance is calculated from the preset "0". and the numeric value is displayed. The electronics are designed to discern which magnet to read the electric field-magnetic field location signal from. The operator then has a precise position/location reading and can adjust the arm as necessary, in the manner described above. The transducer 59 and electromagnet 60 are a magnetostrictive transducer. The magnetostrictive element is an extremely small diameter (I.D. less than 0.0125 inch, i.e., 0.31 mm) Ni—Fe alloy tube held in place inside a protective outer tube forming a waveguide. This waveguide runs the length of the transducer 59. To initiate a measurement for position update, a circuit in the control box 13 has the transducer 59 pulse a current on a conductor wire which has been threaded coaxially through the waveguide. During the short time that this pulse is on, a rotating electromagnetic field surrounds the waveguide. At the same time, lines of field from electromagnet 60 in the guide arms 40 focus on the waveguide. The effect of these two fields is to generate a magnetostrictive strain wave just below the magnets producing a signal which ripples back down the waveguide to a receiver in the transducer 59. This mechanical pulse is converted into an electrical signal. The high-speed clock or an integrator measures the time between launching the current pulse and arrival of the torsional wave. Since the velocity of the torsion pulse is known as a material integrator, the distance will be known. The accuracy of the device to know the position of the guide arm 40 has a resolution of 2.5 um (0.0001 inch).

Furthermore an automatic positioning system can be used to monitor the movement of the edge of the web 44. A camera 66 is used to determine the edge of the web 44 and as result, a signal is sent to the control box 13 to automatically move all the guide arm 40 to maintain their relative position to the edge of the moving web 44. A motion sensor or an infrared system could also be used instead of the camera 66 without departing from the scope of the invention. The memory of the control box 13 is also used to store the positions of the guide arms for numerous set-ups, so multiple orders can be run continuously on the laminator.

Having described the invention with reference to accompanying illustrations of the apparatus of the present invention, it is contemplated that engineering changes can be made without departing from the spirit or scope of the invention as set forth in the appended claims.

The invention claimed is:

1. An apparatus for the positioning of a dispenser for laminating an endless ribbon in relationship to a web moving along a web path, said web having generally parallel edges defining a web width, said apparatus comprising:

a. a frame extending transversally of the web path;

b. a lead screw, supported by said frame, extending transversally of the web path and coupled to a drive means, said lead screw defining a traversing path of a first predetermined length;

c. a guide rail, supported by said frame and extending transversally of the web path and positioned in a parallel direction to said direction of said traversing path and said lead screw;

d. a plurality of guide arms, each said guide arm having:

i. a supporting means to movably attach said guide arm to said guide rail;

ii. a dispensing means for dispensing said ribbon;

iii. a guide arm locking means comprising:

1. lead nut operatively connected to said lead screw;

2. means to lock said guide arm to said lead nut;

3. means to lock said guide arm to said frame;

wherein each said guide arm is selectively connectable to said lead nut or to said frame.

2. An apparatus as claimed in claim 1, wherein said drive means is a motor which rotates said lead screw.

3. An apparatus as claimed in claim 2, wherein when one of said guide arms fixedly connects to one of said lead nuts via said locking means, said connected guide arm moves along said traversing pat as said lead screw is rotated by said motor.

4. An apparatus as claimed in claim 3, wherein said locking means are pneumatic driving cylinders mounted on each said guide arm.

5. An apparatus as claimed in claim 4, wherein each said pneumatic driving cylinder fixedly connects to one of said lead nuts by pushing against that said lead nut in a generally perpendicular direction with respect to said traversing path.

6. An apparatus as claimed in claim 2, wherein when one of said guide arms fixedly connects to said frame via said locking means, said connected guide arm maintains its position on said traversing path as the lead screw is rotated by said motor.

7. An apparatus as claimed in claim 6, wherein said locking means are pneumatic locking cylinders mounted on each said guide arms.

8. An apparatus as claimed in claim 7, wherein each said pneumatic locking cylinder fixedly connects to said apparatus by pushing against said apparatus in a generally perpendicular direction with respect to said traversing path.

9. An apparatus as claimed in claim 2, wherein said locking means are two pneumatic cylinders mounted on each said guide arm, one of said pneumatic cylinders fixedly connects said guide arm to said lead nut so as to move said guide arm along said traversing path as the lead screw is rotated by said motor and one of said pneumatic cylinders fixedly connects said guide arm to said frame to maintain its position on said traversing path as the lead screw is rotated by said motor and wherein only one of said two pneumatic cylinders can be in locking position at any given time.

10. An apparatus according to claim 2, wherein each said guide arm further comprises a bearing support which slides on a series of bearings on said guide rail along said direction of said traversing path.

11. An apparatus as claimed in claim 2, wherein said dispensing means are guide pulleys.

12. An apparatus as claimed in claim 2, wherein said apparatus further comprises:

a. communication means;

b. web edge position detecting means to measure the transversal position of said web;

c. guide arm position measuring means to measure the transversal position of each said guide arm;

d. remote controlling means for actuating said locking means of each said guide arm and said motor;

wherein said remote controlling means are linked to said guide arm position measuring means, said web edge position detecting means and said motor via said communication means.

13. An apparatus as claimed in claim 12, wherein said remote controlling means acquires said transversal position of each said guide arm and said transversal edge position of said web and remotely adjust via said communication means said transversal position of each said guide arms with said locking means and said motor.

14. An apparatus as claimed in claim 12, wherein said guide arm position measuring means comprises:

a. a non-contact transducer located on said frame and extending along said frame;

b. an electronic head for sending a current pulse along said transducer;

c. a floating magnet located on each said guide arm, said floating magnet being adjacent to said transducer, said floating magnet generating a signal in said head when said current pulse reaches said magnet.

15. An apparatus as claimed in claim 12, wherein said communication means includes electronic signals.

16. An apparatus as claimed in claim 12, wherein said communication means includes energy chains and electronic signals.

17. An apparatus as claimed in claim 12, wherein said communication means includes infrared signals.

18. An apparatus as claimed in claim 12, wherein said web edge position detecting means is a camera.

19. An apparatus as claimed in claim 12, wherein said web edge position detecting means is a motion sensor.

20. An apparatus as claimed in claim 12, wherein said web edge position detecting means is an infrared system.

21. An apparatus as claimed in claim 1, wherein said first predetermined length transversely extends beyond said maximum web width such that said plurality of guide arms can be moved outside of said traversing path whereby said guide arms can be thread up with said endless ribbon without stopping said moving web.

22. An apparatus for the positioning of a dispenser for laminating an endless ribbon in relationship to a web moving along a web path having a width, said web having generally parallel edges defining a web width, said apparatus comprising:

a. a frame extending transversally of the web path;

b. a lead screw, supported by said frame, extending transversally of said web path and coupled to a drive means, said lead screw defining a traversing path of a first predetermined length;

c. a guide rail, supported by said frame and extending transversally of said web and positioned in a parallel direction to said direction of said traversing path and said lead screw;

d. a plurality of guide arms, each said guide arm having:

i. a supporting means to movably attach said guide arm to said guide rail;

ii. a dispensing means for dispensing said ribbon;

iii. a guide arm locking means comprising:

1. lead nut operatively connected to said lead screw;
2. means to lock said guide arm to said lead nut;
3. means to lock said guide arm to said frame;

each said guide arm being selectively connectable to said lead nut or to said frame;

wherein said first predetermined length transversely extends beyond said width of said web path.

* * * * *